United States Patent [19]
Landsbergen

[11] Patent Number: 5,561,470
[45] Date of Patent: Oct. 1, 1996

[54] METHOD AND SYSTEM FOR ENTERING A PLURALITY OF DATA INTO AN APPARATUS

[75] Inventor: Sebastianus Landsbergen, Eindhoven, Netherlands

[73] Assignee: U.S. Philips Corporation, New York, N.Y.

[21] Appl. No.: 152,564

[22] Filed: Nov. 12, 1993

[30] Foreign Application Priority Data

Nov. 30, 1992 [EP] European Pat. Off. .............. 92203687

[51] Int. Cl.⁶ .................................................. H04N 5/445
[52] U.S. Cl. ........................ 348/564; 348/569; 345/902; 395/149; 386/46
[58] Field of Search ..................................... 358/183, 335; 348/563, 564, 569, 570, 584, 589; 345/113, 114, 115, 141, 902; 395/144, 145, 146, 148, 149, 155, 156, 161, 153; H04N 7/08, 7/087, 5/445, 5/50

[56] References Cited

U.S. PATENT DOCUMENTS

| | | | |
|---|---|---|---|
| 4,728,949 | 3/1988 | Platte et al. | 340/825.37 |
| 4,963,994 | 10/1990 | Levine . | |
| 5,148,366 | 9/1992 | Buchanan et al. | 395/146 |

FOREIGN PATENT DOCUMENTS

| | | |
|---|---|---|
| 0120345 | 10/1984 | European Pat. Off. . |
| 0160545 | 11/1985 | European Pat. Off. . |
| 0483463 | 5/1992 | European Pat. Off. . |
| 000331 | 11/1983 | Japan ..................................... 395/144 |
| 2155713 | 9/1985 | United Kingdom . |

OTHER PUBLICATIONS

Acerson, Karen L. "WordPerfect® 5.1: The Complete Reference" McGraw–Hill 1990 pp. 677–688.

"Enhanced On–Screen Displays for Simpler TV Control" IEEE Transactions on Consumer Electronics, vol. 38, No. 3, Aug. 20, 1992, pp. 725–733.

"A New Intelligent Remote Control Unit for Consumer Electronic Devices" IEEE Transactions on Consumer Electronics, vol. 31, No. 1, Feb. 28, 1985 pp. 59–69.

*Primary Examiner*—David E. Harvey
*Attorney, Agent, or Firm*—Leroy Eason

[57] ABSTRACT

For operating consumer apparatuses, the consumer often has to enter complicated operating instructions (cf. programming a video recorder). In order to enter the large number of data within such an instruction in a user-friendly way, the apparatus comprises means for forming sentences in steps and for displaying them in a natural language. In each step the data already entered are reproduced and the next data to be entered is identified. In this way communication with the user takes place in a natural language without the user having to enter this language.

5 Claims, 2 Drawing Sheets ary 5,561,470

METHOD AND SYSTEM FOR ENTERING A PLURALITY OF DATA INTO AN APPARATUS

FIELD OF THE INVENTION

The invention relates to a system for entering data into an apparatus and for displaying said data. Such an apparatus may have various forms. It may be, for example a television receiver, a video recorder, and the like. In that case the data are operating data jointly constituting a complicated operating instruction.

BACKGROUND OF THE INVENTION

Consumer apparatuses such as television receivers and video recorders generally have a wide range of operational functions. For their operation the consumer must sometimes enter many data and perform complicated operations. An illustrative example is programming a video recorder. In order to have this recorder record a program transmitted by a given television station at a given date for a given period of time, the consumer must enter these data in a given sequence and in a given format.

In modern apparatuses the operational procedure is often guided or supported by an operation menu which is displayed on a display screen. Such a menu offers the user a survey of selection possibilities and presents the entered data in a readable form. Such an operation system is described, for example in European Patent Application EP-A 0 160 545. The data to be entered (such as day, time, period, channel number) of an operating instruction for a TV receiver are simultaneously indicated on the display screen. Subsequently, they are successively selected for entry by means of a cursor. Although use of this known menu control is increasing, it does not essentially furnish much more than an often cryptical survey of data in a tabular form in which it appears to be difficult for the general consumer to find his way.

It is also known to operate apparatuses with commands which are entered by means of speech or a keyboard. However, this type of entry is subject to considerable limitations. Only a limited vocabulary of predetermined commands is recognized and accepted. The user must know this vocabulary and enter it flawlessly. An illustrative example is the Personal Computer. This mode of operation is unsuitable for use in consumer apparatuses such as television receivers.

Operation of an apparatus by entering a natural language is increasingly being aimed at. This language can be applied by means of speech or a keyboard. However, entry of a natural language requires analysis and interpretation of the language by the apparatus. The mode of speech and text recognition required for this purpose is still insufficiently developed for economically responsible use in consumer apparatuses. For this purpose, the natural language is too rich in words and sentence constructions.

SUMMARY OF THE INVENTION

It is an object of the invention to provide a system with which data can be entered into an apparatus in a user-friendly way.

According to the invention the system comprises a control circuit which is adapted to perform the following steps:

(a) forming and displaying a text sequence which reproduces data already entered and identifies a data to be entered;

(b) entering the identified data;

(c) repeating steps (a) and (b) as long as the plurality of data has not been entered, the composition of the text sequence being grammatically dependent on the number of times step (a) has been performed.

Such a system communicates with the user in a user-friendly way, viz. in the form of a text sequence which may be written in a natural language. However, the language is not generated by the consumer. The system thus need not comprise any complicated speech or text recognition means. Instead, the text is generated by the system itself in a form which is comprehensible to the user. In this way a complicated operating instruction is built up step by step and reproduced. Display of an operating instruction in the natural language is much more user-friendly than display in a cryptical tabular form.

In a practical embodiment the control circuit comprises a memory in which a plurality of text sequences is selectably stored, and selection means for selecting a corresponding text sequence for each step.

The grammatical structure of the displayed text sequence may be adapted to a selected language depending on its grammatical rules. For example, the reproduced order of the data in the displayed sentence may be different for each language, even if the order of entry in both languages is the same. Compare, for example the position of the adverb of time in the English-language sentence "Record the BBC1 program today from 8.00 to 9.00 pm" with the German-language sentence "Nimm heute von 20.00 bis 21.00 Uhr das BBC1 Programm auf". The sentence construction may also be adapted to the data which have been entered. The system may display, for example the operating instruction "Record a BBC1 program" or "Record an ITV program", where the way in which the indefinite article is written is dependent on the station name displayed.

In an embodiment of the system a plurality of values which can be entered is successively presented for the data to be entered. The user can browse through the presented values by means of, for example + and − instructions and confirm these values by means of a decision button.

In a further embodiment the system is provided with indicator means for subjecting an entered data in the displayed text sequence to modification. An operating instruction already entered can then be simply modified afterwards.

DETAILED DESCRIPTION OF THE PREFERRED EMBODIMENTS

Figure 1:
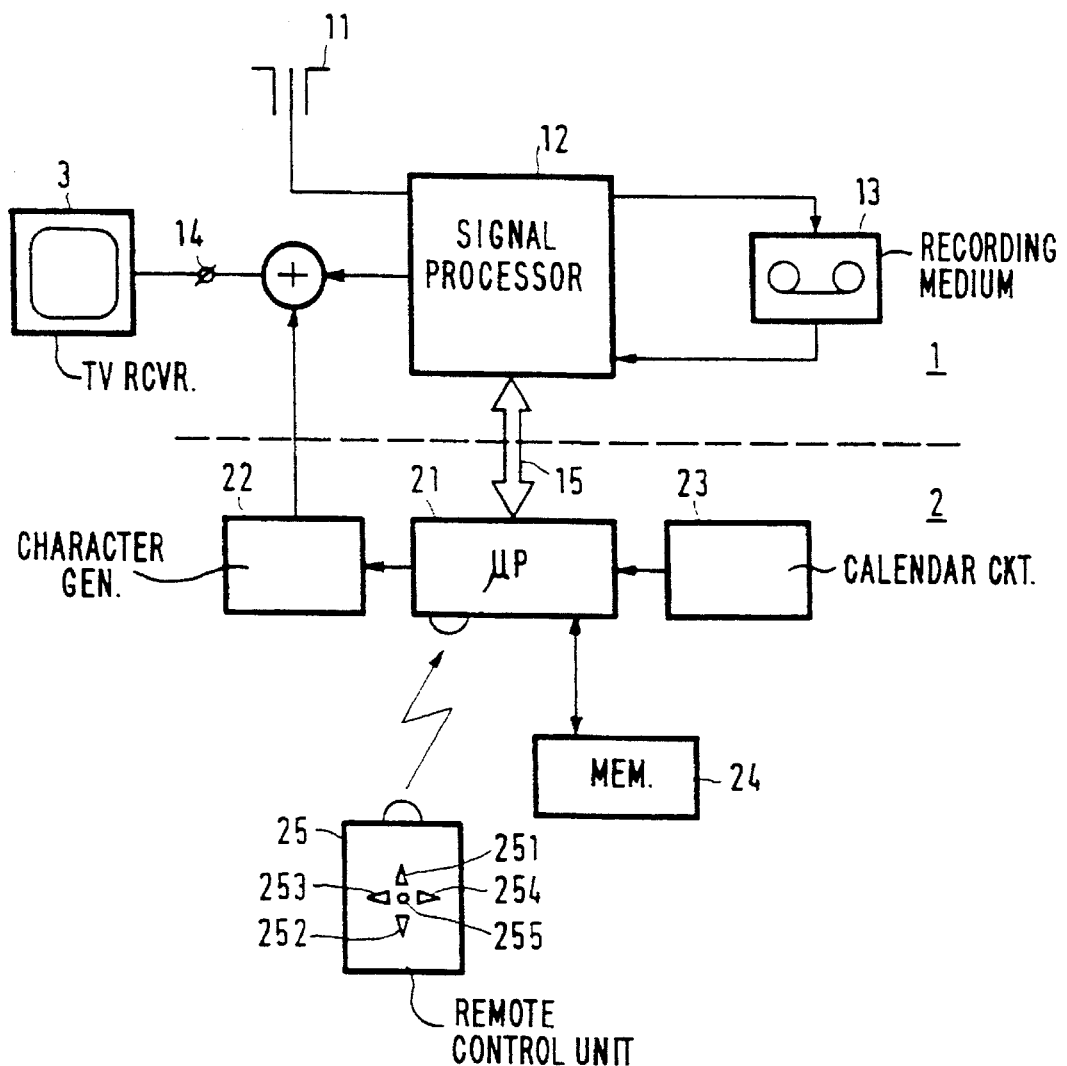
FIG. 1 shows a video recorder including a data entry and display system according to the invention.

The invention will now be described with reference to a video recorder which is shown in FIG. 1. The video recorder has a recording/playback section 1 and a control section 2. The control section 2 constitutes the data entry and display system according to the invention.

The recording and playback section 1 comprises a picture signal input 11, a signal processing circuit 12, a recording medium 13 and a picture signal output 14 which is coupled to a television receiver 3 in the embodiment shown. This section 1 has a conventional structure and need not be further explained.

The control section 2 comprises a microprocessor 21 which is coupled to a character generator 22, a clock and calender circuit 23, a memory 24 and a remote control unit 25. In the embodiment shown the remote control unit has an "up" key 251, a "down" key 252, a "left" key 253, a "right" key 254 and a decision button 255. Other keys which are not important for understanding the invention are not shown in the Figures.

The control section 2 is coupled to the recording and playback section 1 by means of a control bus 15 for causing this section to play back, record, tune to a station and the like. To this end a control program is performed by the microprocessor 21, which program is generally known. The control section also ensures the communication with the user. To this end the microprocesor 21 receives operating instructions from the remote control unit 25 and displays them on the television receiver 3 by means of a character generator 22. Said communication with the user is effected under the control of a communication program which is also stored in the microprocessor 21. The communication program will be explained hereinafter. It has been assumed that the user has notified that he wants to program a television recording. Such an operating instruction requires the entry of a comparatively large number of data, for example a station name or number, a recording date, a start time and a stop time.

A plurality of text sequences (sentences) is stored in the memory 24 of the control section. The microprocessor can select one of these sentences and apply it to the character generator 22 for display on the display screen. The following Table shows a plurality of sentences S(1) ... S(4) which are suitable for display when the video recorder is being programmed. Moreover, each sentence is stored in a plurality of languages in this example (English, German and French).

| | |
|---|---|
| S(1) | Record the P(1) program |
| | Nimm das P(1) Programm auf |
| | Enregistrez le programme P(1) |
| S(2) | Record the P(1) program P(2) |
| | Nimm P(2) das P(1) Programm auf |
| | Enregistrez le programme P(1) P(2) |
| S(3) | Record the P(1) program from P(3) P(2) |
| | Nimm P(2) ab P(3) das P(1) Programm auf |
| | Enregistrez le programme P(1) P(2) de P(3) |
| S(4) | Record the P(1) program from P(3) to P(4) P(2) |
| | Nimm P(2) von P(3) bis P(4) das P(1) Programm auf |
| | Enregistrez le programme P(1) P(2) de P(3) à P(4) |

In the Table the References P(1), P(2), P(3) and P(4) are parameters representing the station name, the recording date, the start time and the stop time, respectively. Upon entry, these parameters are given a value and displayed as such in the sentence. A parameter printed in bold means that it is displayed in a distinguishable manner, for example blinking or in a different colour.

Figure 2:
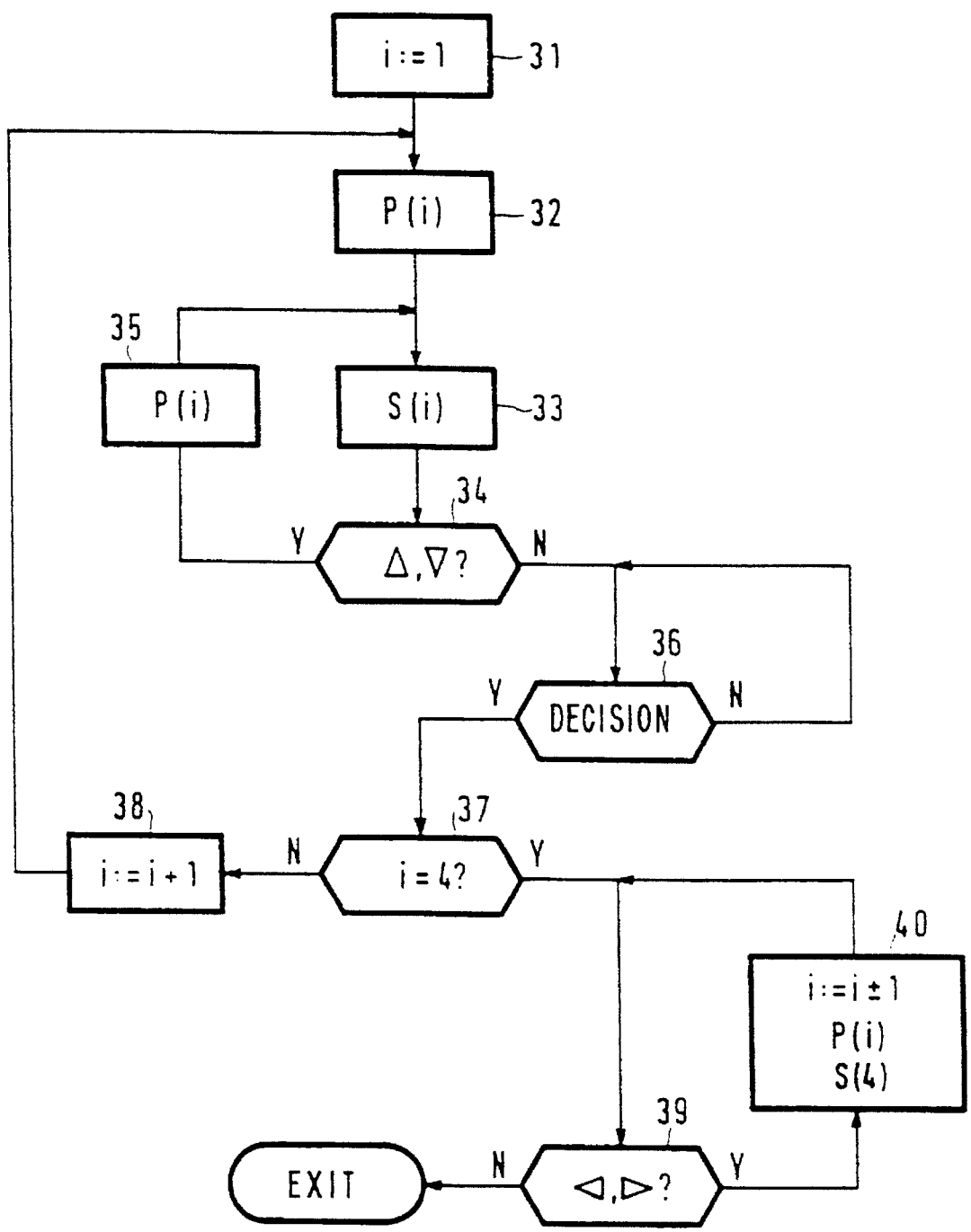
FIG. 2 shows a flow chart of a communication program performed by a microprocessor shown in FIG. 1.

FIG. 2 shows a flow chart of the previously mentioned communication program which is performed by the microprocessor. In a step 31 of this program an initial value is allocated to a variable i (item number). This item number corresponds to a parameter to be entered. More particularly, i=1 means that the station name is entered, i=2 means that the recording date is entered, i=3 means that the start time is entered and i=4 means that the stop time is entered. In the step 31 the item number i is given the initial value 1.

In a step 32 a value is allocated to the parameter P(i). For i=1 (entry of the station name) this value is looked up in a station table which has been composed by the user in a previous installation procedure and is stored in a non-volatile memory (not shown). The station table comprises, for example the names of BBC1, BBC2, ITV, CH4, ...

In a step 33 the sentence S(i) is read from the memory and applied for display to the character generator. For i=1 this means that the sentence S(1) is displayed and that the station name BBC1 is initially filled in for the parameter P(1). Dependent on the selected language, the display screen thus shows the sentence:

"Record the BBC1 program", in which the item BBC1 stands out.

In a step 34 it is subsequently checked whether the user has depressed the "up" key 251 or "down" key 252 (see FIG. 1). If this is the case, the program performs the step 35 so as to modify the value of the parameter P(i). Subsequently, the communication program returns to the step 33. The user can thus browse cyclically through the various station names in the station table by using said keys. If he wants to record a BBC2 program, he can thus realize the display of the sentence:

"Record the BBC2 program".

A waiting time for the energization of the communication program is observed by means of the decision button 255 (see FIG. 1) in a step 36. The program subsequently checks in a step 37 whether the entered item was the last of this operating instruction. As yet, this is not the case. In a step 38 the item number i is raised by 1 and the program returns to step 32. The item number i now acquires the value 2. In the step 33 the sentence S(2) is selected from the memory. The display screen now shows the sentence:

"Record the BBC2 program today", in which "today" is the first of a series of values "today", "tomorrow", "daily", "weekly", "on ..." which can be allocated to the parameter P(2). The possible values of P(2) are also stored (dependent on the language) in the memory 24. In the way already described the user can browse through these values. If the value "on ..." is selected, the microprocessor reads the current date from the clock and calender circuit 23 (see FIG. 1) and adds two days to create the date of the day after tomorrow. Further operation of the "up" and "down" keys causes this date to be postponed or advanced, respectively. In this way the user can realize the display of the sentence:

"Record the BBC2 program on 7 Nov".

If the choice made is confirmed by means of the decision button (step 36), i will acquire the value 3 (step 38) and the display screen will show the sentence S(3) (step 33). This sentence is:

"Record the BBC2 program from 8.00 pm, on 7 Nov" in which the displayed start time can now be modified by the user. If the user chooses 9.00 pm, i will become 4 and the display screen will show the sentence S(4) in which the stop time is asked:

"Record the BBC2 program from 9.00 to 10.00 pm on 7 Nov".

If it has been found in step 37 that i has reached the value 4, the entry of the operating instruction is terminated. However, the user is offered the possibility to modify an entry. To this end it is checked in a step 39 whether the "left" key 253 or the "right" key 254 (see FIG. 1) has been depressed. In that case the item number i is raised or lowered in a step 40 and the parameter P(i) is selected for a possible modification, while the full operating instruction in the form of sentence S(4) is displayed on the display screen.

As is apparent from the German-language version of the sentences S(1) ... S(4) in the memory, the entry of the operating instructions in German would have proceeded as follows:

"Nimm alas BBC2 Programm auf".

"Nimm am 7. Nov das BBC2 Programm auf".

"Nimm am 7. Nov ab 21.00 Uhr das BBC2 Programm auf".

"Nimm am 7. Nov von 21.00 bis 22.00 Uhr das BBC2 Programm auf".

This German-language example illustrates, inter alia, that a displayed sentence is more than a simple addition of a new item to the previous sentence. The grammatical structure of the sentence is different for both languages, although the order of the data to be entered is equal in both cases. The grammatical difference between "from . . . pm/am" in the sentence S(3) and "from . . . to . . . pm/am" in the sentence S(4) is also clearly apparent in the German language.

Finally it is to be noted that the data entry and display system may alternatively be accommodated completely in the remote control unit 25 (see FIG. 1). In that case the remote control unit only needs to transmit the data entries to the video recorder.

What is claimed is:

1. A system for sequentially entering data values of a plurality of parameters into an apparatus in response to a series of grammatically correct command text sequences which are displayed by said system; said system comprising:

a memory for storing a plurality of partial text sequences each of which relates to one of said parameters, the relevant parameter of a particular sequence being signified by an identifier in said sequence;

data processing means for forming a first grammatically correct command text sequence from a first partial text sequence relating to a first of said parameters, said first partial sequence including a first identifier signifying said first parameter;

selection means for successively selecting and entering successive data values into successive command sequences in place of the identifiers therein;

said data processing means further forming a succession of grammatically correct command sequences respectively relating to successive ones of said parameters following said first parameter, each succeeding command sequence including:

i) a partial text sequence relating to the parameter to which said succeeding command sequence relates, said partial sequence including an identifier signifying said parameter;

ii) the immediately preceding command sequence, as modified by substitution therein of a data value in place of an identifier, when inclusion of the modified preceding command sequence is consistent with a grammatically correct form of said succeeding command sequence; and iii) when the modified preceding command sequence does not qualify for inclusion under (ii), an alternative form thereof modified so that it does qualify for inclusion under (ii); and a display for sequentially displaying each successive command sequence upon formation thereof.

2. A method of sequentially entering data values of a plurality of parameters into an apparatus in response to a series of grammatically correct command text sequences; said method consisting of the steps of:

storing a plurality of partial text sequences each of which relates to one of said parameters, the relevant parameter of a particular sequence being signified by an identifier in said sequence;

forming a first grammatically correct command text sequence from a first partial text sequence relating to a first of said parameters, said first partial sequence including a first identifier signifying said first parameter;

successively selecting and entering successive data values into successive command text sequences in place of the identifiers therein;

forming a succession of grammatically correct command sequences respectively relating to successive ones of said parameters following said first parameter, each succeeding command sequence including:

i) a partial text sequence relating to the parameter to which said succeeding command sequence relates, said partial sequence including an identifier signifying said parameter;

ii) the immediately preceding command sequence, as modified by substitution therein of a data value in place of an identifier, when inclusion of the modified preceding command sequence is consistent with a grammatically correct form of said succeeding command sequence; and iii) when the modified preceding command sequence does not qualify for inclusion under (ii), an alternative form thereof modified so that it does qualify for inclusion under (ii).

3. The system as claimed in claim 1, wherein each command text sequence is displayed in one of a plurality of languages.

4. The system as claimed in claim 1, further including a further memory coupled to the selection means for storing a plurality of data values any of which can be selected as said first data value.

5. The system as claimed in claim 1, further including modification means for selecting one data of the plurality of data values for modification.

* * * * *